United States Patent [19]

Hölter et al.

[11] 4,061,476
[45] Dec. 6, 1977

[54] GAS PURIFICATION METHOD AND APPARATUS

[75] Inventors: Heinz Hölter, Gladbeck; Heinz Gresch, Dormund-Derne; Heinrich Igelbüscher, Gladbeck, all of Germany

[73] Assignee: Heinz Holter, Gladbeck, Germany

[21] Appl. No.: 683,205

[22] Filed: May 4, 1976

[30] Foreign Application Priority Data

| | | |
|---|---|---|
| May 6, 1975 | Germany | 2520045 |
| Dec. 9, 1975 | Germany | 2555220 |
| Mar. 4, 1976 | Germany | 2608935 |
| Apr. 10, 1976 | Germany | 2615828 |

[51] Int. Cl.² .................................. B01D 53/06
[52] U.S. Cl. .................................. 55/77; 55/73; 55/99; 55/390; 55/474; 55/479; 23/284; 423/210; 423/239; 423/244

[58] Field of Search ......................... 55/84–95, 55/390, 474, 73, 74, 99, 77–79, 257 C, 479; 23/284; 261/DIG. 54, 78 A, 116, 78 R; 423/244, 225, 230, 239, 231, 210; 302/25, 27, 51, 57, 45, 46; 34/10, 57 B

[56] References Cited

U.S. PATENT DOCUMENTS

| | | | |
|---|---|---|---|
| 1,156,196 | 10/1915 | Willis | 302/27 |
| 2,510,372 | 6/1950 | Bloxham | 34/10 |
| 2,682,444 | 6/1954 | Phillips | 423/231 |
| 2,695,265 | 11/1954 | Degnen | 302/51 |
| 2,875,844 | 3/1959 | Pring | 55/77 |
| 3,339,344 | 9/1967 | Pallinger | 55/90 |
| 3,906,078 | 9/1975 | Hausberg et al. | 423/242 |
| 3,928,005 | 12/1975 | Laslo | 55/73 |
| 3,948,608 | 4/1976 | Weir | 423/242 |

*Primary Examiner*—Bernard Nozick
*Attorney, Agent, or Firm*—Berman, Aisenberg & Platt

[57] ABSTRACT

Pulverulent solid sorption agent is injected into a stream of noxious-contaminant-containing gas subjected to intensive turbulence and then separated from the gas. The solid sorption agent is optionally reused until exhausted, or purified before reuse. Apparatus is provided for the process.

33 Claims, 5 Drawing Figures

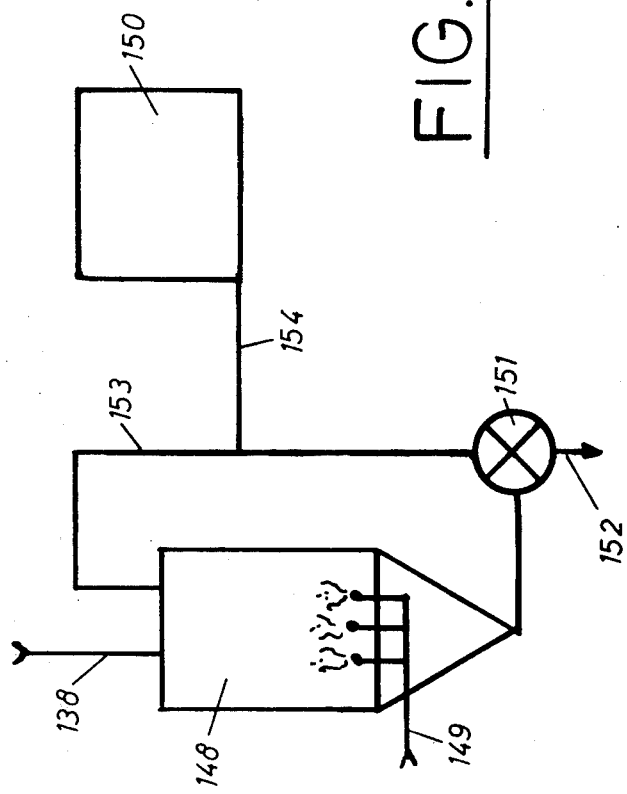

GAS PURIFICATION METHOD AND APPARATUS

BACKGROUND

A number of industrial and other gases have noxious components which may be regarded as contaminants. Such gases are purified or separated from one or more noxious components by contact with solid sorption agents.

The solid sorption agents are single chemical compounds or admixtures of plural ingredients; they are generally employed in a finely-divided state to present the gas with a larger available contact surface. After sorption is effected, the noxious components removed from the gas are separated from the sorption agents, which can then be reused.

Appropriate sorption agents for the removal of recognized noxious components of such contaminated gases are known and available. They are employed in the form of a fixed filter bed (in an unmoved state) through which noxious-component-containing gas is passed or in the form of a fluidized bed.

Where input or contaminated gas is passed through a fixed filter bed, sorption takes place extremely slowly, requiring extraordinarily voluminous filters and considerable energy to force the gas through such filters. When the gas is conducted through a fluidized bed, which consists of granular sorption material, the resulting purification effect is increased only slightly and energy consumption is reduced only slightly; moreover, the granular sorption agent is abraded and the sorption agent must be renewed very often.

Known dry sorption methods for gas purification entail the disadvantage that, in spite of having systems capable of handling very large volumes of sorption agents, only comparatively small volumes of gas are purified and a reasonably-adequate purification is achieved only at gas temperatures in excess of above 600° C. This also makes structural requirements and operation of very large plants extraordinarily expensive.

SUMMARY OF THE INVENTION

The invention relates to a method and to a device for purifying gas or for separating noxious or contaminant components from a gas stream. According to the method a finely-divided or pulverulent solid sorption agent is injected into a gas stream which contains noxious or contaminant components, and the gas stream (with the thus-injected sorption agent) is then subjected to intensive turbulence before separating the solid sorption agent therefrom.

The gas-purification apparatus comprises means for contacting noxious-contaminant-containing input gas with a pulverulent solid sorption agent and for transmitting the gas in a predetermined direction through the following sequential components:
I. Input-gas heating means;
II. At least one conduit means having
  a. a solid-sorption-agent feed means with a substantially axially-disposed and axially-directed exit nozzle pointed in the predetermined direction,
  b. a substantially conical, axially-disposed and axially-directed displacement body downstream of and having an apex pointing toward the exit nozzle, and having a base with a smaller cross-section than that of the conduit and
  c. a peripherally-disposed and axially-directed frusto-conical scraper-ring means downstream of the displacement body and oppositely disposed therefrom; and
III. Means for separating used sorption agent from gas transmitted through component II.

An object of the invention is to create a method and apparatus for gas purification, especially for removing noxious substances from exhaust gases, from flue gases and/or from impellent gases. A further object is to achieve a very high degree of purification. Another object is to provide a method with rapid reaction development so that a small plant can process a substantial volume of gas with little energy expenditure and in which the service life of low-cost sorption agents (which can be reused) is extended.

BRIEF DESCRIPTION OF DRAWINGS

FIG. 5 shows a device for regenerating calcium-compound-containing sorption agent.

DETAILS

Figure 1:
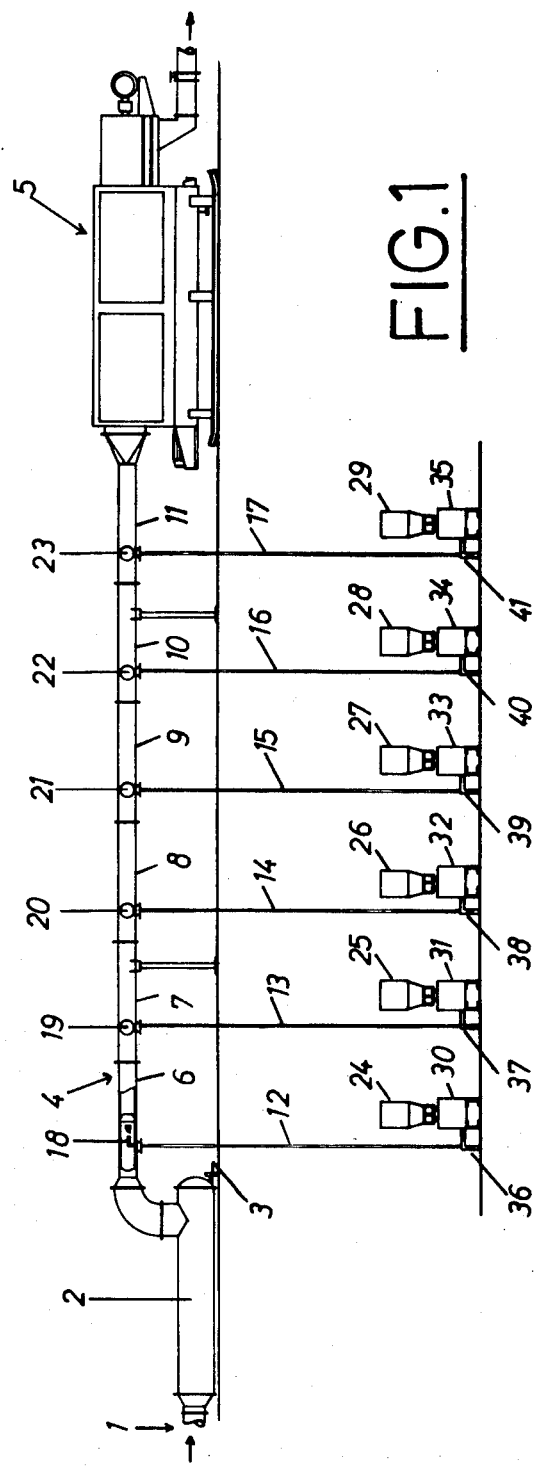
FIG. 1 is a schematic illustration of an experimental plant.

The gas purification method is characterized by injecting pulverulent sorption agent (which reacts with or adsorbs one or more noxious or contaminating components present in a gas) into a stream of the gas, subjecting the gas stream with the sorption agent to intensive turbulence and then separating the sorption agent from the gas. In this manner noxious or contaminating substances (primarily, but not necessarily, gases) are removed from a gaseous composition containing them. The gaseous composition is brought into intimate contact with a solid sorption agent which is thereafter separated therefrom.

Quite surprisingly, such an intensive turbulence between the sorption agent and the gas is achieved with a Venturi meter or tube that the resulting sorption reaction takes place extraordinarily rapidly. It is thus not only possible to achieve a very high degree of purification in a comparatively small plant, but the method can also be carried out at considerably lower temperatures than those possible for known methods. A considerable savings in energy results. Moreover, the feasibility of the method is not impeded by high temperatures. The gas to be purified, as a rule, in treated at its existing temperature without supplemental heating. The method is readily performed at atmospheric, at reduced (under partial vacuum) or at even greatly increased (superatmospheric) pressure. It is thus advantageously used, for example, for desulfurizing natural gas (for which considerable economic advantages are realized) without any need for reducing the natural pressure of the gas. The pulverulent sorption (e.g. absorption or adsorption) agent is completely insensitive to mechanical stress. The comminution of the sorption agent's particles, which is unavoidable because of the heavy mechanical stress, is not disadvantageous as in the methods included in the state of the art; it is actually rather advantageous.

An absorption agent, e.g., which has been separated from the gas can be repeatedly reintroduced into the gas current until its absorption capability has been exhausted or has been reduced to such an extent that it will be more economical to discard the absorption agent or, when possible and economically feasible, to recondition it. This facilitates a considerable increase in the method's economy.

In one preferred version, a gas current or stream (containing noxious components) runs through several successive venturi meters (or tubes) each directly followed by a separator which removes absorbent [sorption agent]. Thus-removed and used absorbent is reintroduced into the gas stream at the venturi tube immediately preceding (upstream) that at which it was previously introduced. Although absorbent in the individual venturi tubes is necessarily conducted in the direction of gas current flow, an overall countercurrent effect (which leads to a high degree of purification and particularly economical utilization of the absorbent) is achieved in this manner.

When absorbent is reused according to the last-noted cycle, a desired level of absorbing capacity is maintained by removing from the cycle a part of the used absorbent and introducing into the cycle of corresponding quantity of fresh absorbent. Part of the absorbent separated immediately downstream from the first (most upstream) venturi tube, considering the direction of the gas current, is, e.g., removed from the cycle and a similar amount of fresh absorbent is, e.g., introduced at the final (most downstream) tube. This results in a complete countercurrent cycle of the absorbent.

Alternatively, only fresh absorbent is first introduced at the last (final) venturi tube, considering the direction of flow, and only afterward is it piped into the absorbent cycle which comprises the preceding venturi tubes. Through the use of fresh absorbent in the last venturi tube, the highest degree of purification is attainable and very minor residual concentrations of noxious substances are thus removed from the gas.

Typical of the type of gas compositions which lend themselves to the present treatment are exhaust gases, flue gases and impellent gases.

Exhaust gases are waste gases generated in technical processes, e.g. in burning fuels and other substances. Their undesirable components may be gaseous, liquid or solid.

One typical example of an exhaust gas is the exhaust gas from a garbage incineration plant, the gas comprising $CO_2$, $O_2$, CO, $N_2$, $SO_2$, $Cl^2$, F, $NO_x$. Typical contents of $SO_2$ are 0.1 . . . 1g/$Nm^3$, of Cl− 0.5 . . . 5 g/$Nm^3$ and of F 2 . . . 30 mg/$Nm^3$.

Another typical example of an exhaust gas is the exhaust gas of a diesel engine:

| | | |
|---|---|---|
| $CO_2$ | 4.3... 7 | vol% |
| CO | 0.1... 0.2 | " |
| $H_2O$ | 3.9... 6 | " |
| $O_2$ | 10... 14 | " |
| $H_2$ | 0.1 | " |
| $N_2$ | 77 | " |
| $SO_2$ | | |
| $NO_x$ | | |

Reference is made to Lueger, "Lexikon der Technik", Vol. 6, Stuttgart 1965, pp. 6 - 7.

Flue gases are gases from burning gaseous, liquid and solid fuel for the purpose of generating heat. Typical Examples are:

| coal fired power station | | | |
|---|---|---|---|
| $CO_2$ | 10...14 vol% | 12 | vol% |
| $O_2$ | 1... 5 " | 2 | " |
| $N_2$ | 82...88 " | 86 | " |
| $NO_x$ | 300... 700 ppm | 500 | ppm |
| F | 20... 60 " | 37 | " |
| $SO_2$ | 800...2000 " | 1500 | " |
| oil fired power station | | | |
| $CO_2$ | 10...16 vol% | 11 | vol% |
| $O_2$ | 2... 8 " | 5 | " |
| $N_2$ | 82...88 " | 84 | " |
| $NO_x$ | 200... 600 ppm | 400 | ppm |
| $SO_2$ | 400...4000 " | 2500 | " |

Impellent gases

Typical examples are: natural gas, Bentheim, Federal Republic of Germany

| | |
|---|---|
| $CO_2$ | 3 vol% |
| $H_2S$ | 1 " |
| $CH_4$ | 86 " |
| $C_2^+$ | 1 " |
| $N_2$ | 9 " |

Reference is made to Leuger, "Lexikon der Technik", Vol. 4, Stuttgart 1962, p. 176.

| coke oven gas | | | | |
|---|---|---|---|---|
| $CO_2$ | 1 ... 3 | vol% | 1.3 | vol% |
| $C_2H_4$ | 1.5 ... 3 | " | 1.9 | " |
| $C_6H_6$ | 0.3 ... 0.7 | " | 0.5 | " |
| $O_2$ | 0.1 ... 0.3 | " | 0.1 | " |
| CO | 5 ... 6.8 | " | 6.4 | " |
| $H_2$ | 58 ... 63 | " | 61.9 | " |
| $CH_4$ | 20 ... 25 | " | 23.9 | " |
| $N_2$ | 3 ... 11 | " | 4.0 | " |
| $H_2S$ | 3 ... 12 | g/$Nm^3$ | 8.0 | g/$Nm^3$ |
| $NH_3$ | 3 ... 10 | " | 6 | " |
| HCN | 0.8 ... 2 | " | 1.2 | " |
| $NO_x$ | 0.5 ... 1.5 | ppm | 0.8 | ppm |
| $NH_4Cl$ | | | | |
| $NH_4SCN$ | | | | |
| phenol and phenolic substances | | | | |
| tar. | | | | |

Reference is made to Dr. Otto Grosskinsky, "Handbuch des Kokereiwesens", Vol. II, Dusseldorf 1958, pp. 1 - 14

The degree of achievable purification is further increased when the absorption agent contains dust-free bog iron ore and/or pulverulent iron oxide (a by-product of steel production).

Pulverulent amorphous silicon dioxide (obtained during electrothermal production of ferrosilicon) is a particularly advantageous sorption agent. This absorbent, which does not react chemically with the noxious substances, is regenerated in a simple and known manner and is thus readily reused. During its use, no difficultly-removable waste products are obtained. Expanded perlites are optionally added to the absorbent; they, likewise, do not react chemically with the noxious substances. Like pulverulent amorphous silicon dioxide, they have good physical absorption properties and are also suitable for supplying moisture to the reaction.

Filtering charcoal is a further alternative absorbent for this process. Such charcoal is, e.g., in the form of pulverulent filtering charcoal dust or of powdery carbon which is obtained during the electrothermal procurement of carbon-metal compounds.

The sorption agent comprises a single compound or an admixture of two or more components having sorptive properties. The absorbents are advantageously of grain sizes of less than 100 $\mu$, preferably less than 50 $\mu$. Of course, a not too large proportion of coarser grain is harmless.

It is a good idea for the absorbent to contain water. When lime hydrate is used as absorbent, this material already contains a certain quantity of moisture; otherwise the absorbent is, optionally, moistened. Expanded perlites are particularly suitable as moisture carriers. Water vapor is, alternatively, added to the gas composition to be purified. Through the presence of water (which is added in a sufficiently small amount to preclude impairment of the fluidity of the absorbent) the course of the reaction is speeded up considerably; the purification effect is improved and the absorbent is better utilized.

When $N_2O$ or other nitric oxides are present in the gas composition (to be purified), an oxidation agent is advantageously added to the gas composition prior to contact with the absorbent. The oxidant is, e.g., hydrogen superoxide and/or a potassium permanganate solution. As a result, the purification effect is improved in terms of $N_2O$ and other nitric oxides, and resinous deposits in the device are prevented.

To improve the economic advantage of the subject process, the reaction speed is increased by maintaining the input (crude) gas composition at or heating it to a temperature of at least 120° or, better still, 160° C, and to have the gas composition at this temperature before and thus at the time it is brought into contact with the absorbent. It is not disadvantageous for the gas composition to be at a higher temperature; such will only speed up the reaction. In other words, it is necessary to cool the gas composition prior to the reaction, i.e., contacting it with sorption agent, only if its temperature is so high that the device used to carry out the procedure might be damaged thereby.

Suitable sorption agents for different noxious or contaminant components in gaseous compositions are known. All those which are solid and are available or can be prepared in pulverulent form are useful for the subject invention as long as their sorptive properties are not inordinately encumbered by the temperature of or by particular components in the gas composition being treated.

When calcium compounds, e.g. lime hydrate and/or dolomite dust, are used as absorbents, calcium sulfite will essentially form during the ensuing reaction. The used-up or spent absorbent is then optionally processed into calcium sulfate by adding air and milk of lime thereto, and this calcium sulfate is precipitated or is further processed into gypsum. The above-mentioned used-up absorbent is alternatively liberated of noxious substances by heating in a Claus furnace, which produces calcium oxide; adding moisture thereto converts the calcium oxide into lime hydrate, which is useful as absorbent. The separated noxious substances are further processed according to the Claus method to obtain essentially elemental sulfur. The other noted absorbents are also regenerated in a Claus furnace.

One device preferred for implementing the method has venturi tube sections which consist of pipe segments in which absorbent entry nozzles follow each other in the direction of gas flow. The nozzles are arranged roughly centrally in the pipe segments, axially disposed and pointing in the direction of gas flow. The pipe segments also contain displacement bodies which are centrally arranged, axially disposed and approximately conical in shape; the apex or tip of each displacement body points counter to the direction of flow. Scraper rings, which restrict the pipe cross section and which roughly have the shape of a frustum of a right circular conical shell, are axially disposed and peripherally located in the pipe segments. Several successive arrangements of (one each in a venturi section) entry nozzle, displacement body and scraper ring are provided.

Several versions of the method according to the invention and apparatus used for its implementation are hereinafter described with reference to the drawings.

In the plant illustrated in FIG. 1, the gas composition to be treated is introduced at 1 into a crude-gas heating section 2. In the crude-gas heating section, the gas to be treated is heated to a temperature of about 160° C by the open flame of a conventional oil burner which is supplied with light-oil heating oil. The gas to be treated is flue gas of a light-oil-fired furnace which, for experimental purposes, was additionally enriched with noxious substances prior to entry into the crude-gas heating section 2. A steam entry 3 (through which water vapor is optionally added to the gas to be treated) opens into the crude-gas heating section 2. A treatment section, labeled number 4, follows crude-gas heating section 2 and is followed by a tissue filter 5. Following tissue filter 5 and not illustrated in the drawing is a fan which suctions the gas to be treated through the entire device and through which the treated gas exits, e.g., into the atmosphere.

In treatment or reaction section 4 comprising several series-connected pipe segments (6 through 11), each of which had a feed pipe (12 through 17) which serves to introduce absorbent into the reaction section via an entry or exit nozzle (18 through 23) which is arranged centrally and axially in each pipe segment (6 through 11) and through which the absorbent enters the gas stream. The absorbent is in pressure-tight storage containers (24 through 29), from which it is taken via dosing devices (30 through 35) and conducted (by compressed air) via conveyor nozzles (36 through 41) into pertinent feed pipelines (12 through 17).

Figure 2:
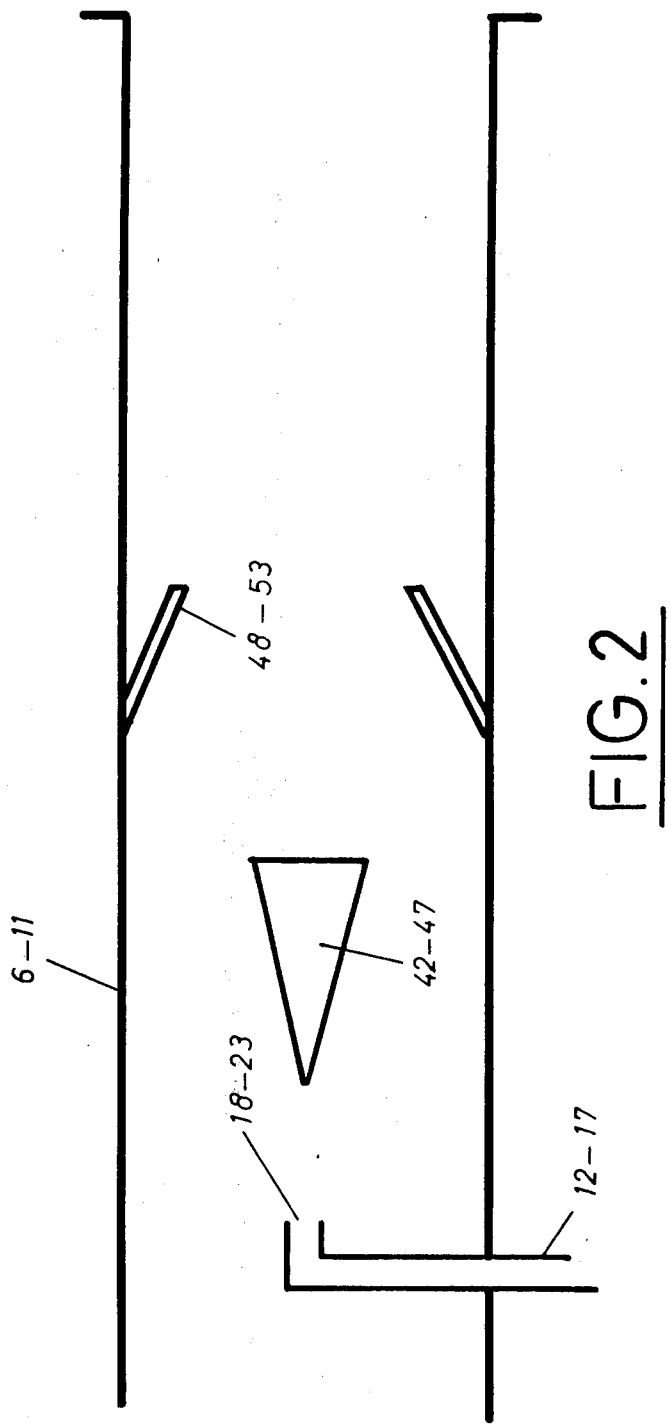
FIG. 2 shows a Venturi section, a portion of FIG. 1.

In each pipe segment (6 through 11) in treatment section 4, there follows (as illustrated in FIG. 2) after a particular nozzle (18 to 23), in the gas flow direction indicated by arrows, an approximately conical displacement body (42 to 47). The displacement body is connected by means of narrow bars, which do not create any noteworthy flow resistance to the gas and are not illustrated, with the inside wall of the pipe segment (6 to 11). The displacement bodies (42 to 47), as in the case of a venturi nozzle, reduce the cross-section available for gas flow. As a result, the gas current at the end of the displacement body experiences extraordinarily forceful tubulence and produces a very intensive mixing of the added absorbent with the gas. This, in turn, speeds up the reaction between gas and absorbent. A scraper ring (48 through 53) is arranged after each displacement body (42 through 47). The scraper ring is a body which roughly has the shape of a cone-shaped shell segment or of a funnel and whose outer circumference is connected with the inside wall of a pipe segment (6 through 11). The scraper rings (48 through 53) are effective by the cross section available for gas flow in a manner similar to acceleration sections of a venturi pipe; they also prevent a deposit of absorbent on the inside wall of the pipe. Absorbent deposited there would no longer participate in the reaction and could even narrow the pipe cross section impermissibly; instead, the absorbent is again and again directed into the middle of the pipe. Only by means of scraper rings (48 through 53), at small pressure loss and therefore at small energy consumption, is so intensive a contact achieved between the gas current and the absorbent that an extraordinarily-great purification (mentioned in connection with the experimental results) is achieved.

Although, in general terminology, a venturi section has a progressive reduction in cross section extending over a part of the length of the section and an adjoining progressive increase in cross section extending over a further portion of the length of the section, the term "venturi sections" was nevertheless selected for pipe segments 6 through 11 because these pipe sections have, in each case, two longitudinal sections in which the cross section is reduced. This involves those longitudinal sections with displacement bodies (42 through 47) and those with scraper rings (48 through 53). After (downstream of) the displacement bodies and after the scraper rings the pipe immediately achieves its full cross section again. That part of the "venturi section" within which the cross section grows again is thus present, but its length is equal to zero.

After reaction section 4 (as in FIG. 1) is, e.g., a cloth filter 5 which separates the absorbent from the gas. The absorbent obtained in filter 5 is, optionally, charged into containers (24 through 29) until such time as its absorption capacity is exhausted or until it is no longer sufficient to achieve effective purification.

The apparatus illustrated in FIG. 1 is subject to numerous variations. After one or more of the pipe sections (6 through 10) additional filters or other devices for separating absorbent from gas are optionally arranged. In this way portions of absorbent can be restricted to one or any combination of pipe sections 6 through 11.

Experiments have been conducted with the device illustrated in FIGS. 1 and 2. In some experiments the reaction section 4 was 10.35 m long; pipe sections 6 through 11, of which the reaction section 4 is made up, had an inside diameter of 310 mm; the tip of each conical displacement body (42 through 47) was 110 mm away from the opening of the respective nozzle (18 through 23); the displacement body (42 through 47) was 140 mm long; the diameter of the displacement body at its circular (terminal) surface was 100 mm; the distance from the terminal surface of each displacement body (42 through 47) to the start of the adjacent scraper ring (48 to 53 respectively) was 120 mm; the inside diameter of the displacement ring was 210 mm and its depth was 155 mm.

During these experiments about 9,000 m³ flue gas were conducted through the apparatus per hour. In the portions of pipe sections 6 through 11, which were not narrowed by built-in accessories, there was a gas speed of about 33 m/sec. At the end of the displacement body (42 through 47), the gas speed was about 40 m/sec and at the end of the scraper rings (48 through 53) it was about 70 m/sec.

The flue gas of light-oil-fired furnace was used as crude gas. In addition to the noxious substances already present in it, more sulfur dioxide was added to the flue gas prior to its entry into the crude-gas heating section 2. The concentration of noxious substances contained in the crude gas, including the added sulfur dioxide, was determined prior to the entry of the crude gas into the crude gas heating section 2. Furthermore, the concentration of the noxious substances in the purified gas (after the fan following filter 5 but not illustrated in the drawing) was measured. The crude gas was heated to a temperature of 160° C in the crude gas heating section 2. Through each of the nozzles (18 through 23), absorbent was introduced into the gas stream; specifically, a total volume of about 5 kg/hr, corresponding roughly to five times the quantity of absorbent determined stochiometrically for the complete reaction with the noxious substances. Commercially-available, finely-powdered lime hydrate [calcium hydroxide, Ca (OH)$_2$] was used as absorbent. The lime hydrate has a moisture content within the range of from about 3 to 6% prior to use. After it had been run through the apparatus several times, the absorbent was used again. During an approximately 4-hour experimental run, the following noxious-substance concentrations were found in the purified gas, as compared with these found in the crude gas:

|  | Crude Gas | Purified Gas |
| --- | --- | --- |
| $SO_2$ | 2,700 mg/m³ | 15 mg/m³ |
| $H_2S$ | 1,800 mg/m³ | 100 mg/m³ |
| $N_2O$ | 300 mg/m³ | 30 mg/m³ |

These experimental results show that (for large scale industrial application of the method according to the invention) a purification of at least 95% (regarding $SO_2$ removal) is available.

Further experiments showed better utilization of lime hydrate (as absorbent) when saturated water vapor is added at 3 to the gas stream to be purified. The water vapor is added in such a small quantity that the fluidity of the powdery absorbent is not impaired. Furthermore, removal of nitrogen oxides ($NO_x$), e.g. $N_2O$, from nitrogen-oxide-containing gas compositions is improved considerably by adding small quantities of hydrogen peroxide ($H_2O_2$) at 3 to such compositions; this also prevents the appearance of resin-like deposits in the plant.

Further examples are illustrated with reference to FIGS. 3 and 4.

Figure 3:
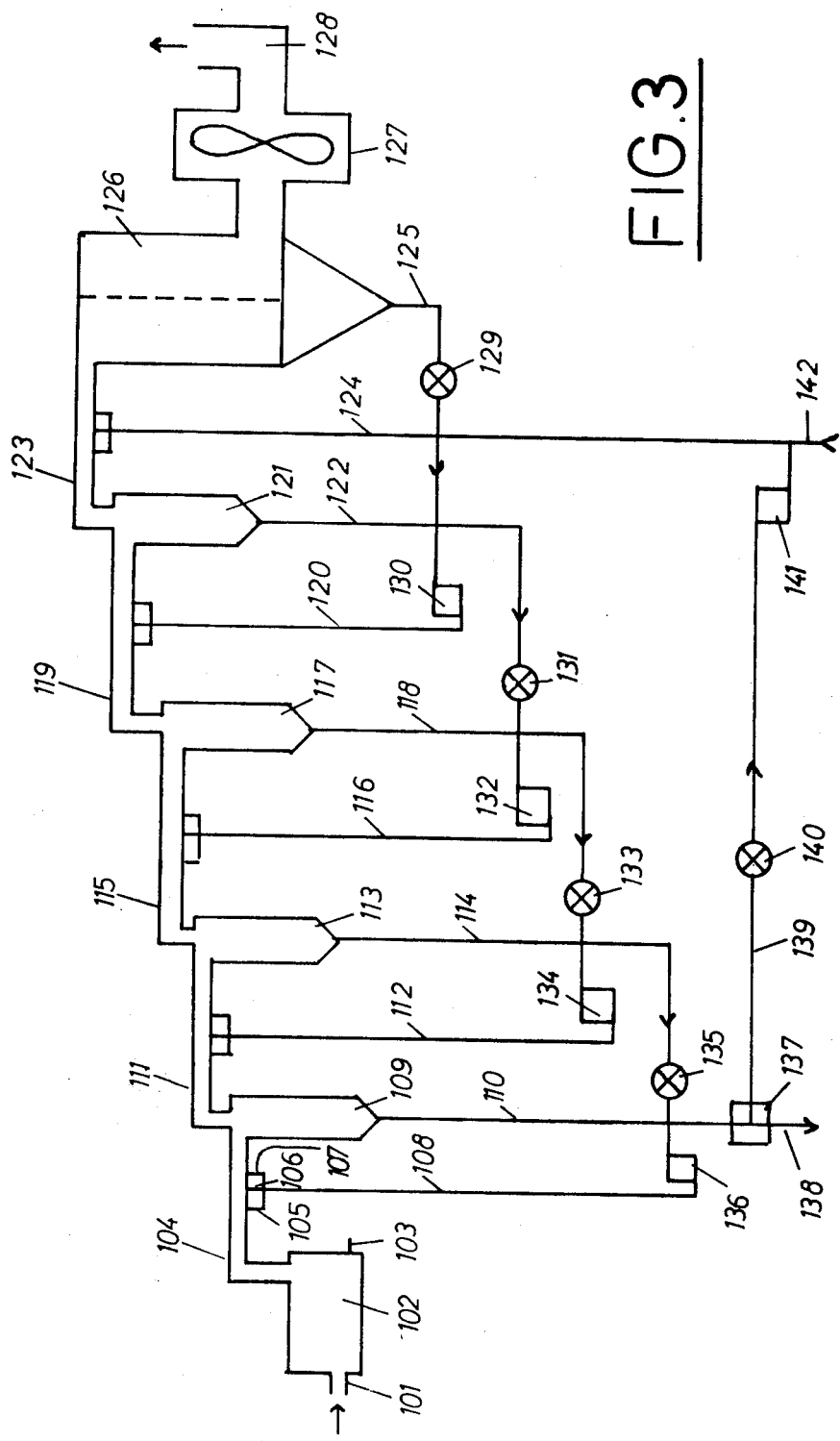
FIG. 3 is a diagram of a large-scale industrial plant.

In a large-scale industrial plant illustrated in FIG. 3, the gas to to treated is fed in at 101. The gas first goes into a crude section 102 in which, if necessary or desired, it is heated up to about 160° C by the open flame of a heating-oil burner. In contrast to known methods in which gas is heated to a temperature of from 600° to 800° C (at least 400° C) for purposes of purification, a temperature higher than the above-mentioned 160° C is not necessary for the presently-illustrated method. However, if the gas is already at a higher temperature, it can still be purified at that temperature. At 103 water vapor and/or oxidant, such as hydrogen peroxide or a potassium permanganate solution is optionally added to the gas.

From crude-gas heating section 102 the gas composition to be treated goes into a first venturi section 104. Venturi section 104 and all of venturi sections following in FIGS. 3 and 4 correspond to that of FIG. 2 in terms of structure but, in FIG. 3 and in FIG. 4, three of the arrangements illustrated in FIG. 2 are series-connected in each venturi section. To supply absorbent to venturi section 104, there are therefore three feed pipes (105, 106, 107) which open up into a common feed pipe 108 so that feed pipe 108 may supply absorbent to the venturi section 104. Adjoining venturi section 104, separator 109 serves to separate absorbent from the gas. In this example separator 109 is a cyclone separator, but different separators which are suitable for the separation of powdery solid substances from gases are known and are alternatively useful in place of the cyclone separator. The absorbent need not necessarily be completely removed from the gas. The separated absorbent passes into pipeline 110.

Following separator 109 are three additional venturi sections (111, 115, and 119), after each of which is connected a separator (113, 117, and 121) as well as, finally, a last venturi section (123), after which is connected separator 126. In this particular example, separator 126 is a cloth filter which so extensively removes absorbent from the purified gas that the particular requirements (established for the purified gas in terms of its freedom from dust) are met.

Adjoining separator 126 is a fan (127) which forces the gas into an exhaust gas stud or chimney (128). Fan 127 suctions or draws the gas to be purified through the entire system or plant. If the gas composition enters the system under sufficiently high pressure to be conveyed by this pressure through the system, fan 127 is not necessary. The subject plant or system is suitable, not only for purifying gas under atmospheric or somewhat lower pressure, but also for purifying gases which are under a greater pressure of, for example, 40 to 60 bars.

The absorbent is condducted in a cycle in the plant illustrated in FIG. 3. The absorbent which (after passing through venturi section 123) is separated from the gas in separator 126 moves through a pipeline 126, a conveyor device 129, and an intermediate container 130 (which can be provided with a dosing device) into feed pipeline 120 and from there into the next to last venturi section 119. Correspondingly, the absorbent runs through separators 121, 117, 113 and 109, as well as venturi sections 115, 111 and 104. From separator 109 the absorbent moves through pipeline 110 into an adjustable device component 137 in which the quantity of absorbent coming from pipeline 110 is subdivided into two different quantity components in an adjustable quantity ratio. A, e.g., smaller quantity component is removed from the cycle through pipeline 138. A larger quantity component moves via a pipeline 139 (in which a conveyor device 140 is optionally provided) into an intermediate storage container 141 which, in turn is optionally provided with a dosing device. From intermediate container 141 thus-used absorbent is conveyed into feed pipeline 124 and from there into venturi line 123. Besides, fresh absorbent is introduced into pipeline 124 through a pipeline 142 in a quantity which corresponds to the quantity of absorbent separated from the cycle through pipeline 138. The amount of fresh absorbent supplied to the cycle at 142 is computed and/or determined through experiiments on the basis of the noxious-substance content of the gas being purified and the degree of purification required.

Figure 4:
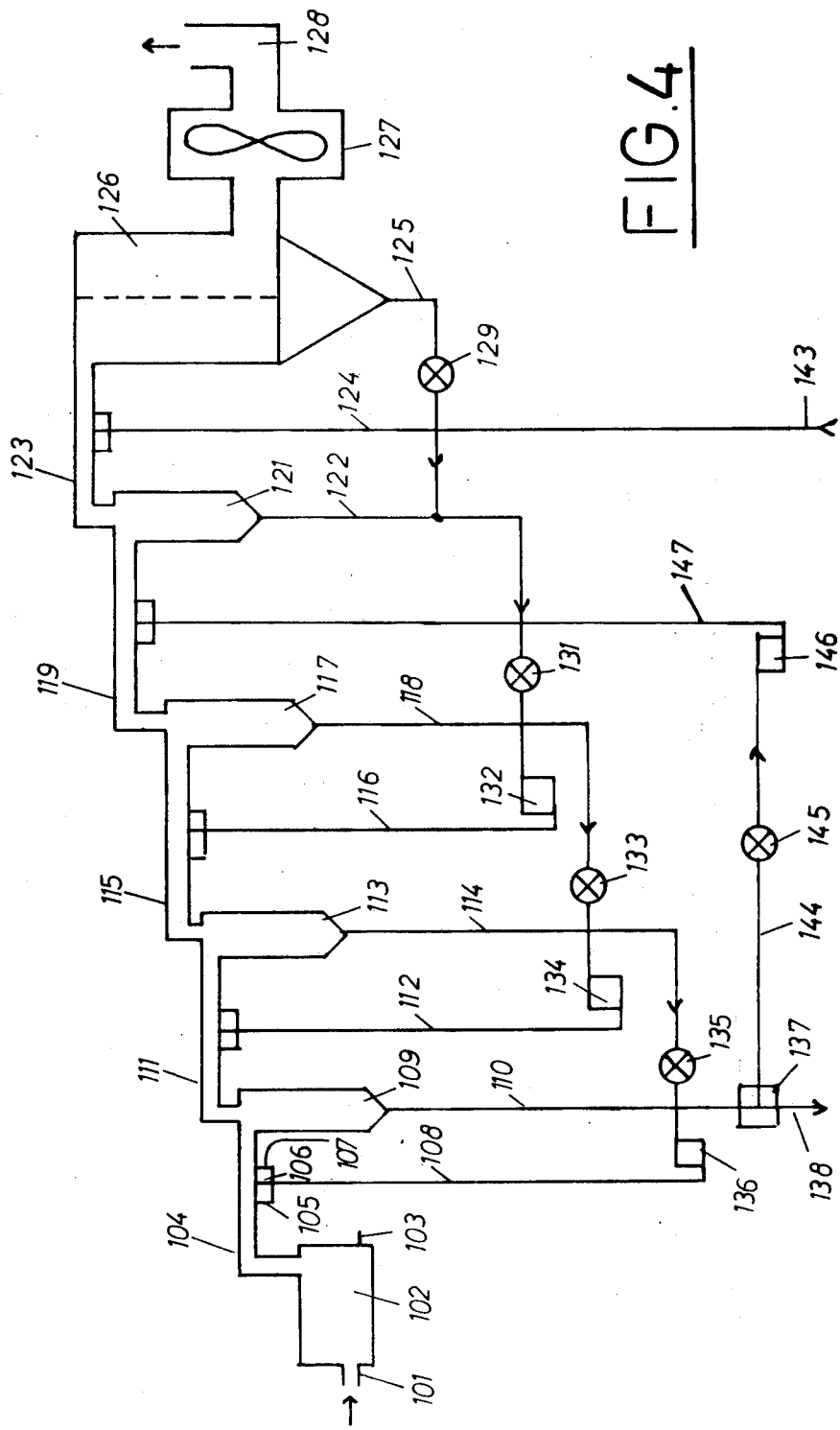
FIG. 4 shows an alternative version of the same plant.

The apparatus illustrated in FIG. 4 differs from the device of FIG. 3 by virtue of the fact that the last venturi section 123 only has fresh absorbent running through it. The fresh absorbent is supplied to venturi section 123 through pipeline The amount of used sorption agent passing through component 137 and which is intended for return into the system is (according to FIG. 4) supplied via pipeline 144, if necessary, by conveyor device 145 and intermediate container 146, which is optionally provided with a dosing device, via pipeline 147 to the next to last venturi section (119) and afterward runs effectively countercurrently through the plant as in FIG. 3. Description concerning FIG. 3 applies also to FIG. 4 with regard to the feed-in and evacuation of absorbent.

Using the device according to FIG. 4, very small residual quantities of noxious substances are removed from the gas to be purified. This is due to the fact that exclusively fresh absorbent is used in the final venturi section 123.

The conveyor devices and/or intermediate container illustrated in FIGS. 3 and 4, for example, 129 and 130, are optionally omitted, e.g., when the gas to be purified is suctioned through the plant. Pressure boilers or pressure transmitters are illustrative of suitable conveyor devices, for example 129. They optionally assume the function of the intermediate container, for example, 130. Where a pressure medium is used for conveying absorbent within the plant, compressed air is ordinarily suitable for this purpose. When an admixture of air and gas to be purified is undesired or dangerous, such as in the purification of natural gas, the gas that is being purified in the plant or another gas that is incapable of reacting with that gas is a suitable pressure medium.

The absorbents (removed from the cycle at 138 from the devices according to FIGS. 3 and 4) are optionally regenerated. When the absorbent is primarily or extirely a calcium compound, for example calcium hydrate, and when the noxious substance, as is often the case, is predominantly sulfur dioxide, calcium sulfite forms predominantly in the absorbent. Such an absorbent is, e.g., regenerated according to FIG. 5 by conducting it via pipeline 138 into an oxidation container 148 to which air is supplied through a pipeline 149. Oxidation container 148 contains a medium, for example lime milk, that promotes oxidation so that liquid-phase oxidation is effected. The lime milk is, e.g. maintained in a container or tank 150. As a result of oxidation calcium sulfate is formed; this is separated from the liquid. The calcium sulfate is passed from container 148 to centrifuge 151 and evacuated or collected at 152. The liquid effluent from centrifuge 151 is supplied via pipeline 153, possibly with the addition of lime milk from container 150 via a pipeline 154, to oxidation tank 148. The calcium sulfate coming out of 152 can be dumped because it is harmless to the environment or it can be regenerated, for example, into gypsum.

Regeneration of the absorbent is optionally accomplished by heating in a Claus furnace and processing developing hydrogen sulfide into elemental sulfur according to the Claus method. By heating lime hydrate (used as absorbent), calcium oxide is formed. This is converted into lime hydrate by adding moisture thereto. Such lime hydrate is useful as absorbent. The last-described method is also suitable for the regeneration of other absorbents, for example powdery silicon dioxide, which is likewise useful in the disclosed process as absorbent.

Contaminated gas compositions and those containing noxious components are well known. Also, those contaminants and those noxious components which are subject to sorption with suitable pulverulent solid sorption agents, as well as the particular pulverulent sorption agents for the specific contaminants and noxious components, are also known. These, per se, do not constitute the invention to which the instant disclosure and claims are directed.

The invention and its advantages are readily understood from the proceding description. Various changes may be made in the process and in the apparatus without departing from the spirit and scope of the invention or sacrificing its material advantages. The process and apparatus hereinbefore described and illustated in the drawings are merely indicative of preferred embodiments of the invention.

What is claimed is:

1. In a gas purification method wherein gas, containing at least one contaminant and/or noxious component, is contacted with a solid sorption agent which selectively attracts the contaminant and/or noxious component and is subsequently separated from the solid sorption agent, the improvement comprising introducing the solid sorption agent, in purverulent form, into the flowing stream of the gas and then subjecting such stream, containing the solid sorption agent, to intense turbulence, by diverting the stream outwardly by a cone and then inwardly by a frusto-conical ring, before separating the solid sorption agent therefrom.

2. A process according to claim 1 wherein the sorption agent comprises an alkali metal compound or an alkaline earth metal compound.

3. A process according to claim 1 wherein the sorption agent is powdery amorphous silicon dioxide.

4. A process according to claim 1 wherein the sorption agent contains finely-powdered bog-iron ore or powdery iron oxide.

5. A process according to claim 1 wherein the sorption agent contains expanded perlite.

6. A process according to claim 1 wherein the sorption agent contains powdery filtering charcoal.

7. A process according to claim 1 wherein the sorption agent contains water in an amount which is insufficient to impair its flow properties.

8. A process according to claim 1 which comprises introducing water vapor into the gas prior to contacting the latter with the solid sorption agent.

9. A process according to claim 1 which comprises introducing an oxidant into the gas prior to contacting the latter with a solid sorption agent.

10. A process according to claim 1 wherein the gas is at a temperature of at least 120° C at the time of contact with the sorption agent.

11. A process according to claim 1 which comprises repeatedly introducing the solid sorption agent into and withdrawing it from the flowing gas stream.

12. A process according to claim 11 which comprises subjecting the gas stream and solid sorption agent to intense turbulence ater each introduction of solid sorption agent and prior to each withdrawal thereof.

13. A continuous process according to claim 12.

14. A process according to claim 1 wherein the solid sorption agent is an absorbent which is conducted through a venturi section in admixture with the flowing gas stream.

15. A process according to claim 14 comprising reintroducing into the gas stream absorbent separated from the gas stream.

16. A process according to claim 5 comprising separately introducing the absorbent into the gas stream at a plurality of positions therealong.

17. A process according to claim 14 comprising introducing, withdrawing and reintroducing the absorbent along the gas stream in effective countercurrent flow, and subjecting the gas and admixed absorbent to intense turbulence between each introduction into and withdrawal from said gas stream.

18. A process according to claim 17 comprising recirculating absorbent which has been used throughout different portions of the gas stream.

19. A process according to claim 17 which comprises limiting the final introduction of absorbent into the gas stream to introduction thereinto of fresh absorbent.

20. A process according to claim 17 which comprises replacing some of the used absorbent with fresh absorbent.

21. A process according to claim 20 which comprises replacing absorbent withdrawn following the most upstream introduction thereof by absorbent injected at the most downstream introduction thereof.

22. A process according to claim 1 wherein the sorption agent is lime hydrate or calcium carbonate.

23. A process according to claim 22 wherein the sorption agent is dolomite flour.

24. Apparatus for conducting the process of claim 1 which comprises, in sequence, gas-conduit means and solid/gas-separator means, the gas-conduit means having at least one section within which there is:
a solid sorption agent supply means,
a solid-sorption-agent feed means connected to the supply means and having a substantially axially-arranged, downstream-directed and centrally-positoned exit-nozzle means,
a substantially-conical, axially-disposed and centrally-positioned displacement body downstream of and having an apex pointing toward the exit-nozzle means, and having a base,
a peripherally-arranged and axially-disposed frusto-conical scraper-ring means downstream of the displacement body and oppositely disposed therefrom;
each such section being part of and sequentially arranged to form the ga-conduit means.

25. Apparatus according to claim 24 wherein the gas-conduit means comprises a plurality of sections, each having at least one solid-sorption-agent feed means, displacement body, scraper ring and solid-sorption-agent withdrawal means.

26. Apparatus according to claim 25 wherein the base of the displacement body reduces the effective cross-sectional area of the gas-conduit means by about 10 percent.

27. Apparatus according to claim 25 wherein the inside cross-section of the scraper-ring means is about 46 percent of the cross-sectional area of the gas-conduit means.

28. Apparatus according to claim 25 wherein the apex of each displacement body is separated from an exit-nozzle means by a distance which is about 36 percent of the diameter of the gas-conduit means.

29. Apparatus according to claim 25 wherein the base of each displacement body is separated from the widest point of the nearest scraper-ring means by a distance which is about 39 percent of the diameter of the gas-conduit means.

30. Apparatus according to claim 25 wherein the length of the scraper-ring means is about 50 percent of the diameter of the gas-conduit means.

31. Apparatus according to claim 25 wherein the feed means and withdrawal means are arranged for effective counter-current flow of solid sorption agent.

32. Apparatus according to claim 24 which further comprises gas-heating means serially connected to the gas-conduit means which, in turn, is connected to the solid/gas-separator means.

33. Apparatus according to claim 32 having means connected to the gas-heating means for introducing gas into said means and separate means connected to the gas-heating means for introducing a further substance into the apparatus.

* * * * *

UNITED STATES PATENT AND TRADEMARK OFFICE
CERTIFICATE OF CORRECTION

PATENT NO. : 4,061,476

DATED : December 6, 1977

INVENTOR(S) : HÖLTER ET AL

It is certified that error appears in the above-identified patent and that said Letters Patent are hereby corrected as shown below:

Title Page, item [73] "Holter" should read --Hölter--. Column 3, line 20, "of" should read --a--; line 45, "$Cl^2$" should read --Cl--; line 46, "Cl-" should read --Cl--. Column 4, line 39, "Dusseldorf" should read --Düsseldorf--. Column 8, line 38, "to to" should read --to be--; line 50, "solution" should read --solution,--. Column 9, line 22, "condducted" should read --conducted--; line 40, "turn" should read --turn,--; line 49, "experiiments" should read --experiments--; line 56, "pipeline" should read --pipeline 143.--. Column 10, line 20, "extirely" should read --entirely--; line 30, "e.g." should read --e.g.,--. Column 11, line 8, "purverulent" should read --pulverulent--; line 9, "the flowing" should read --a flowing--; line 54, "5" should read --14--. Column 12, line 20, "toned" should read --tioned--; line 30, "ga-conduit" should read --gas-conduit--.

Signed and Sealed this

Twenty-fourth Day of October 1978

[SEAL]

Attest:

RUTH C. MASON
Attesting Officer

DONALD W. BANNER
Commissioner of Patents and Trademarks